United States Patent
Haladu et al.

(10) Patent No.: US 9,359,458 B2
(45) Date of Patent: *Jun. 7, 2016

(54) POLYZWITTERIONIC ACID ANTISCALANT COMPOUND

(71) Applicant: KING FAHD UNIVERSITY OF PETROLEUM AND MINERALS, Dhahran (SA)

(72) Inventors: Shamsuddeen Abdullahi Haladu, Dharan (SA); Shaikh Asrof Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 187 days.

This patent is subject to a terminal disclaimer.

(21) Appl. No.: 14/141,177

(22) Filed: Dec. 26, 2013

(65) Prior Publication Data

US 2015/0183903 A1    Jul. 2, 2015

(51) Int. Cl.
*C08F 26/04* (2006.01)
*C08F 126/04* (2006.01)
(Continued)

(52) U.S. Cl.
CPC . *C08F 26/04* (2013.01); *C02F 5/12* (2013.01); *C08F 126/04* (2013.01);
(Continued)

(58) Field of Classification Search
CPC ........ C08F 128/02; C08F 28/02; C08F 26/02; C08F 26/04; C08F 26/06; C08F 126/02; C08F 126/04; C08F 126/06; C08F 126/226; C08F 228/02; C11D 1/88; C11D 1/90; C11D 1/92; C02F 5/12
See application file for complete search history.

(56) References Cited

U.S. PATENT DOCUMENTS 4,671,888 A    6/1987    Yorke
5,116,513 A    5/1992    Koskan et al.
(Continued)

OTHER PUBLICATIONS

Ali, Shaikh A. et al, "Cyclopolymerization Protocol fo rthe Synthesis of a Poly(zwitterion-alt-sulfur dioxide) to Investigate the Polyzwitterion-to-Poly(anion-zwitterion) Transition", Published online Dec. 10, 2012 Journal of Applied Polymer Science, 1293(3), 1394-1404.*

(Continued)

*Primary Examiner* — Bijan Ahvazi
*Assistant Examiner* — David L Miller
(74) *Attorney, Agent, or Firm* — Richard C. Litman

(57) ABSTRACT

The polyzwitterionic acid antiscalant is an antiscalant for use in desalination plants and the like for inhibiting $CaSO_4$ and $SO_4^{2-}$ scale precipitation. The polyzwitterionic acid (PZA) antiscalant has the following structural formula:

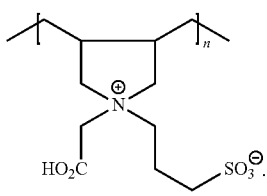

In order to make the PZA antiscalant, N-carboethoxymethyl-3-(N,N-diallylamino)propanesulfonate, a zwitterionic monomer, is cyclopolymerized in aqueous solution using tert-butyl hydroperoxide (TBHP) to make an intermediate polyzwitterion (PZ). Acidic hydrolysis of the ester groups of the PZ is performed to produce the PZA antiscalant. Evaluation of the antiscalant properties of the PZA antiscalant using concentrated brines revealed that the PZA antiscalant, at a concentration of 10 ppm, is very effective in inhibiting the formation of calcium sulfate scale, particularly in reverse osmosis plants.

1 Claim, 5 Drawing Sheets

(51) Int. Cl.
  *C08F 226/04* (2006.01)
  *C02F 5/12* (2006.01)
  *C08F 226/06* (2006.01)
  *C08F 226/02* (2006.01)
  *C08F 126/06* (2006.01)
  *C08F 28/02* (2006.01)
  *C08F 26/02* (2006.01)
  *C08F 128/02* (2006.01)
  *C08F 26/06* (2006.01)
  *C08F 126/02* (2006.01)
  *C08F 228/02* (2006.01)
  *C11D 1/88* (2006.01)
  *C11D 1/90* (2006.01)
  *C11D 1/92* (2006.01)
  *C02F 1/44* (2006.01)
  *C02F 103/08* (2006.01)

(52) U.S. Cl.
  CPC .............. *C08F 226/04* (2013.01); *C02F 1/441* (2013.01); *C02F 2103/08* (2013.01); *C02F 2303/22* (2013.01); *C08F 26/02* (2013.01); *C08F 26/06* (2013.01); *C08F 28/02* (2013.01); *C08F 126/02* (2013.01); *C08F 126/06* (2013.01); *C08F 128/02* (2013.01); *C08F 226/02* (2013.01); *C08F 226/06* (2013.01); *C08F 228/02* (2013.01); *C11D 1/88* (2013.01); *C11D 1/90* (2013.01); *C11D 1/92* (2013.01)

(56) References Cited

U.S. PATENT DOCUMENTS

| | | |
|---|---|---|
| 7,264,736 B2 | 9/2007 | Kuboth |
| 7,659,354 B2 * | 2/2010 | Song ..................... C08F 226/04 510/361 |
| 8,372,786 B2 | 2/2013 | Berkland et al. |
| 8,937,104 B2 * | 1/2015 | Ali ....................... C08G 75/205 521/28 |

OTHER PUBLICATIONS

Armentrout, R. Scott et al., "Water Soluble Polymers. 76. Electrolyte Responsive Cyclocopolymers with Sulfobetaine Units Exhibiting Polyelectrolyte or Polyampholyte Behavior in Aqueous Media", Macromolecules, 33(2), 419-424, 2000.

Ali, Sk. A. et al., "Synthesis and Solution Properties of a New pH-Responsive Polymer Containing Amino Propanesulfonic Acid Residues," Journal of Polymer Science Part A: Polymer Chemistry, 41(1), 172-184, 2003.

Mazumder, Mohammad A.J. et al., "Synthesis and Solution Properties of a New Poly(electrolyte-zwitterion)," Polymer, 45(1), 125-132, 2004.

Ali, Shaikh A. et al., "Cyclopolymerization Protocol for the Synthesis of a Poly(zwitterion-alt-sulfur dioxide) to Investigate the Polyzwitterion-to-Poly(anion-zwitterion) Transition", Journal of Applied Polymer Science, 129(3), 1394-1404, 2013.

Haladu, Shamsuddeen A. et al., "Cyclopolymerization Protocol for the Synthesis of a New Poly(electrolyte-zwitterion) Containing Quaternary Nitrogen, Carboxylate, and Sulfonate Functionalities," European Polymer Journal, 49(6), 1591-1600, Jun. 2013.

* cited by examiner

POLYZWITTERIONIC ACID ANTISCALANT COMPOUND

BACKGROUND OF THE INVENTION

1. Field of the Invention

The present invention relates to antiscalants for reverse osmosis plants, and particularly to a polyzwitterionic acid (PZA) antiscalant compound used to inhibit the formation of scale, particularly calcium sulfate ($CaSO_4$) scale.

2. Description of the Related Art

Reverse osmosis (RO) is a water purification technology that uses a semipermeable membrane. This membrane-technology is not properly a filtration method. In RO, an applied pressure is used to overcome osmotic pressure, a colligative property, that is driven by chemical potential, a thermodynamic parameter. RO can remove many types of molecules and ions from solutions and is used in both industrial processes and in producing potable water. The result is that the solute is retained on the pressurized side of the membrane and the pure solvent is allowed to pass to the other side. To be selective, this membrane should not allow large molecules or ions through the pores (holes), but should allow smaller components of the solution (such as the solvent) to pass freely. RO is commonly used in desalination plants. In the reverse osmosis desalination process, the feed water splits into product water and reject brine streams. The dissolved salts in the feed water are concentrated in the reject brine stream. If supersaturation occurs and their solubility limits are exceeded, precipitation or scaling will occur.

The deposits commonly encountered in the desalination process include mineral scales (e.g., $CaCO_3$, $CaSO_4$ and $Mg(OH)_2$), corrosion products, polymeric silica and suspended matter. The specific mechanism of inhibition of scaling is sequestration, or the capability of forming stable complexes with polyvalent cations. The antiscalant-treated solutions are stabilized via alteration in crystal morphology at the time of nucleation and subsequent inhibition in growth rate. Commonly used antiscalants are derived from three chemical families: condensed poly(phosphate)s, organophosphates, and polyelectrolytes. The anionic form of the antiscalants helps prevent scale formation by sequestering the cations.

Due to the extraordinary chelating properties of compounds containing aminomethylphosphonic acid groups in the molecule, it would be desirable to use such a compound for the synthesis of low molecular-weight chelating agents containing these functional groups, allowing for the formation of polymer-heavy metal ion complexes from wastewater. Further, present antiscalants typically have a relatively high phosphorous content, which is damaging to the environment. It would be further desirable to produce an effective antiscalant with a low phosphorous content.

Thus, a polyzwitterionic acid antiscalant compound solving the aforementioned problems is desired.

SUMMARY OF THE INVENTION

The polyzwitterionic acid antiscalant is an antiscalant for use in desalination plants and the like for inhibiting $CaSO_4$ and $SO_4^{2-}$ scale precipitation. The polyzwitterionic acid (PZA) antiscalant has the following structural formula:

In order to make the PZA antiscalant, N-carboethoxymethyl-3-(N,N-diallylamino)propanesulfonate, a zwitterionic monomer, is cyclopolymerized in aqueous solution using tert-butyl hydroperoxide (TBHP) to make an intermediate polyzwitterion (PZ) having the structural formula:

Acidic hydrolysis of the ester groups of the PZ is performed to produce the PZA antiscalant. Evaluation of the antiscalant properties of the PZA antiscalant using concentrated brines revealed that the PZA antiscalant, at a concentration of 10 ppm, is very effective in inhibiting the formation of calcium sulfate scale, particularly in reverse osmosis plants.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
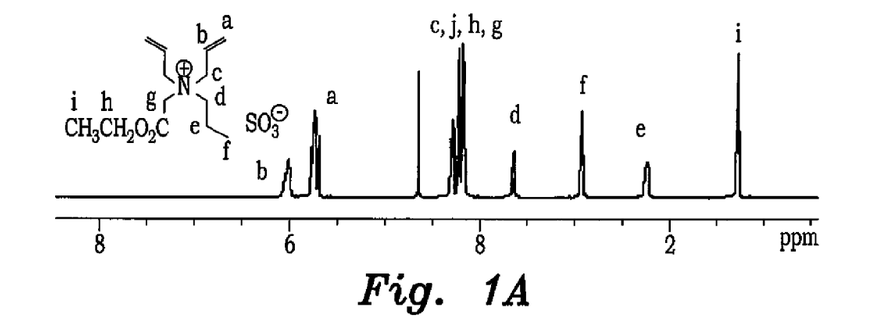
FIG. 1A shows the $^1H$ NMR spectra for a zwitterionic monomer, N-carboethoxymethyl-3-(N,N-diallylamino)propanesulfonate, synthesized as part of a method of making a polyzwitterionic antiscalant compound.
Figure 2A:
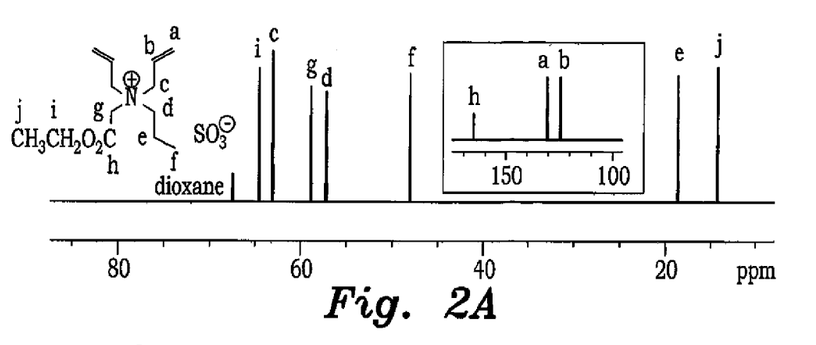
FIG. 2A shows the $^{13}C$ NMR spectra for the zwitterionic monomer, N-carboethoxymethyl-3-(N,N-diallylamino)propanesulfonate, of FIG. 1A.

The polyzwitterionic acid antiscalant is an antiscalant for use in desalination plants and the like for inhibiting CaSO$_4$ and SO$_4^{2-}$ scale precipitation. The polyzwitterionic acid (PZA) antiscalant has the following structural formula:

In order to prepare the PZA antiscalant, a zwitterionic monomer N-carboethoxymethyl-3-(N,N-diallylamino)propanesulfonate is first prepared. The zwitterionic monomer has the following structural formula:

and is prepared by first mixing together a solution of N,N-diallyl-N-carboethoxymethylamine (24.4 g, 0.133 mol) and 1,3-propanesultone (16.3 g, 0.133 mol) in acetonitrile (130 cm$^3$), which is then stirred under N$_2$ at 72° C. for 72 hours. This reaction mixture was homogeneous, but solidified as it cooled to room temperature. After removal of the solvent by a gentle stream of N$_2$ at a temperature of 60° C., the solid salt of zwitterionic monomer N-carboethoxymethyl-3-(N,N-diallylamino)propanesulfonate was recrystallized from a methanol/acetone/diethyl ether mixture as white crystals (33.4 g, 82%). The $^1$H NMR and $^{13}$C NMR spectra are shown in FIGS. 1a and 2a, respectively. The $^{13}$C and $^1$H NMR spectra were measured in D$_2$O (using an HOD signal peak at 4.65 and a dioxane $^{13}$C peak at 667.4 as internal standards) on a JEOL® JNM-LA500 500 MHz spectrometer, manufactured by Jeol Corporation Ltd. Of Tokyo, Japan: Mp 162-163° C. (closed capillary); (Found: C, 50.9; H, 7.7; N, 4.5; S, 10.4%. C$_{13}$H$_{23}$NO$_5$S requires C, 51.13; H, 7.59; N, 4.59; S, 10.50%); $v_{max}$ (KBr): 3415, 2984, 1740, 1639, 1468, 1410, 1217, 1042, 961, 733 and 606 cm$^{-1}$; $\delta_H$ (D$_2$O) 1.28 (3H, t, J 7.05 Hz), 2.24 (2H, quint, J 7.05 Hz), 2.92 (2H, t, J 6.7 Hz), 3.65 (2H, apparent t, J 7.95 Hz), 4.31–4.17 (8H, m), 5.75 (4H, m), 6.02 (2H, m), (HOD: 4.65); $\delta_C$ (D$_2$O) 14.08, 18.65, 48.09, 57.20, 58.87, 63.21 (2C), 64.46, 124.38 (2C), 130.79 (2C), 166.05 (dioxane: 67.40 ppm).

For the cyclopolymerization of the zwitterionic monomer N-carboethoxymethyl-3-(N,N-diallylamino)propanesulfonate, all polymerizations were carried out under the conditions shown in Table 1 below using 10 mmol of monomer in each entry. However, the experiment under entry 7 was repeated on a larger scale.

TABLE 1

Cyclopolymerization of the monomer N-carboethoxymethyl-3-(N,N-diallylamino)propanesulfonate

| Entry No. | Initiator[a] (mg) | NaCl (M) | Temp (° C.) | Time (h) | Yield[b] (%) | [η][c] (dL g$^{-1}$) | $\overline{M}_w$ | (PDI)[d] |
|---|---|---|---|---|---|---|---|---|
| 1 | TBHP (20) | 3.00 | 80 | 48 | 38 (44) | 0.0700 | — | — |
| 2 | TBHP (20) | 1.50 | 80 | 48 | 49 (56) | 0.0658 | — | — |
| 3 | TBHP (20) | 0.750 | 80 | 48 | 49 (51) | 0.0736 | — | — |
| 4 | TBHP (40) | 0.750 | 90 | 24 | 68 (83) | 0.0773 | 49.1 × 10$^3$ | 2.46 |
| 5 | TBHP (40) | 0 | 90 | 24 | 21 (29) | 0.0746 | — | — |
| 6 | APS (150) | 0.750 | 90 | 4 | 54 (60) | 0.0695 | — | — |
| 7 | TBHP (80) | 1.00 | 90 | 24 | 73 (85) | 0.0789 | 51.0 × 10$^3$ | 2.43 |

[a]Polymerization reactions were carried out in aqueous solution of monomer N-carboethoxymethyl-3-(N,N-diallylamino)propanesulfonate (10 mmol) (75 w/w % monomer) in the presence of ammonium persulfate (APS) or tert-butyl hydroperoxide (TBHP). Polymerization under entry 7 was carried out on a larger scale of 20 mmol.
[b]Isolated yields; the yields determined by $^1$H NMR analyses of the crude reaction mixture are written in parentheses.
[c]Viscosity of 1-0.25% polymer solution in 0.1M NaCl at 30° C. was measured with Ubbelohde Viscometer (K = 0.005718).
[d]Polydispersity index.

Figure 1B:
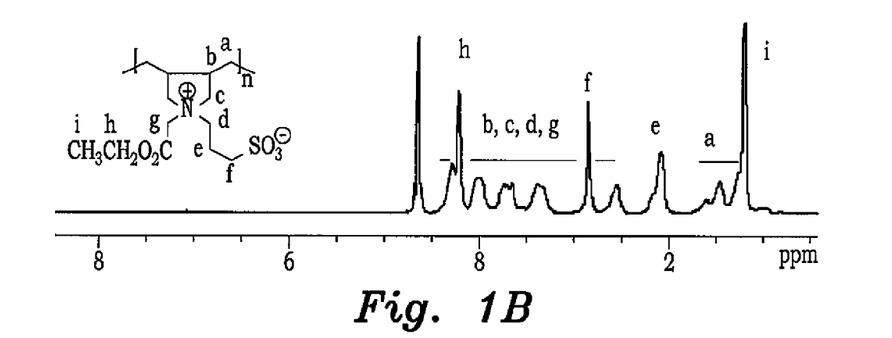
FIG. 1B shows the $^1H$ NMR spectra for a polyzwitterion (PZ), synthesized as part of a method of making a polyzwitterionic antiscalant compound.
Figure 1C:
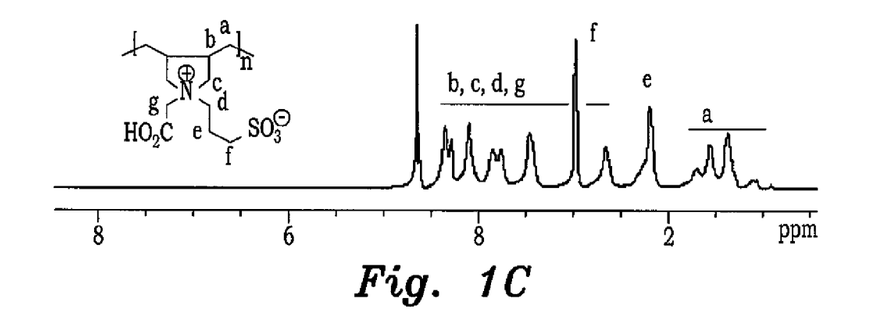
FIG. 1C shows the $^1H$ NMR spectra for the polyzwitterionic acid (PZA) antiscalant compound according to the present invention.
Figure 1D:
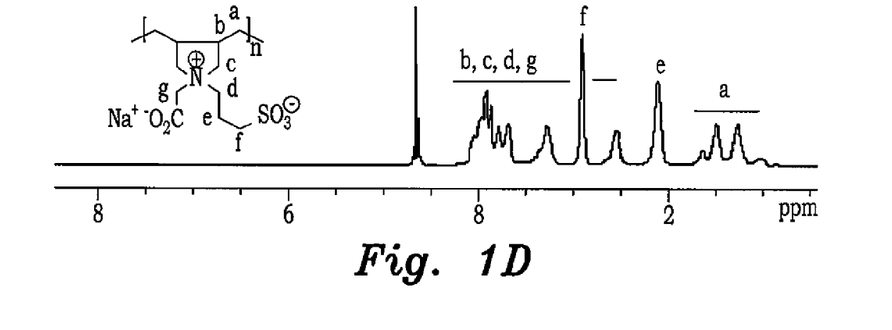
FIG. 1D shows the $^1H$ NMR spectra for a poly(electrolyte-zwitterion) (PEZ) synthesized from the polyzwitterionic acid antiscalant compound according to the present invention.
Figure 2B:
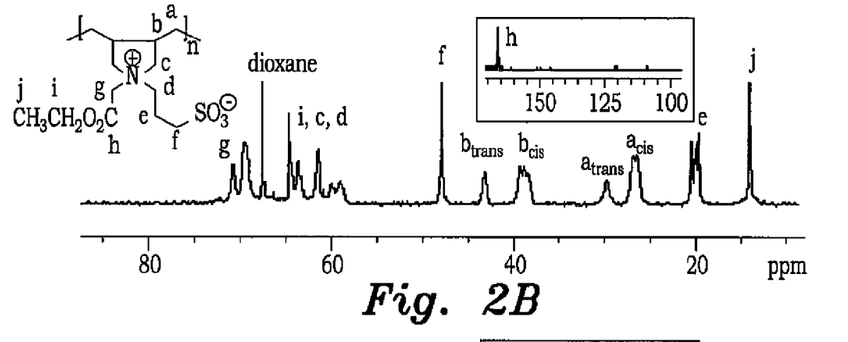
FIG. 2B shows the $^{13}C$ NMR spectra for the polyzwitterion of FIG. 2B.
Figure 2C:
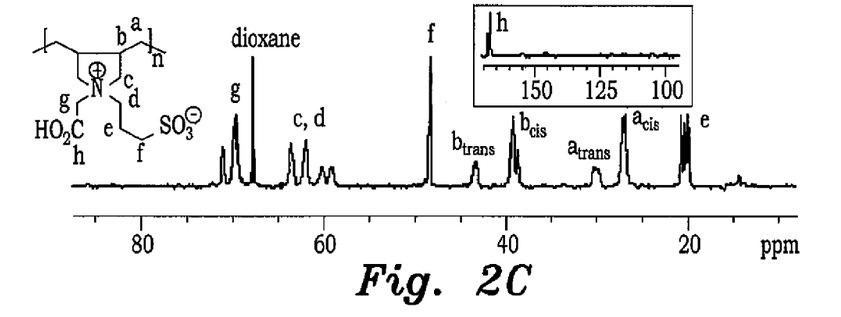
FIG. 2C shows the $^{13}C$ NMR spectra for the polyzwitterionic acid antiscalant compound according to the present invention.
Figure 2D:
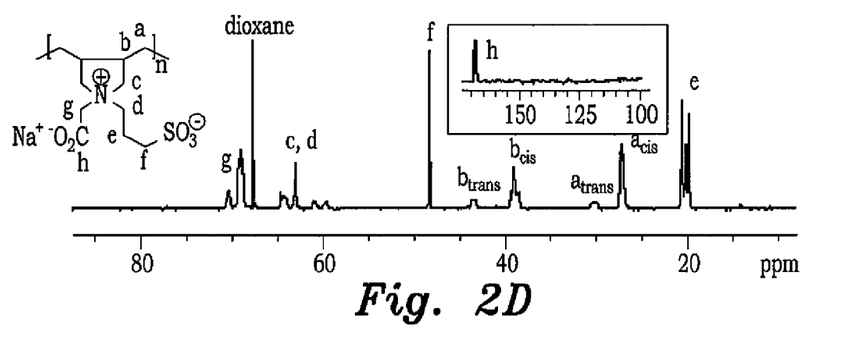
FIG. 2D shows the $^{13}C$ NMR spectra for the poly(electrolyte-zwitterion) of FIG. 1D.

A solution of the monomer N-carboethoxymethyl-3-(N,N-diallylamino) propanesulfonate (6.1 g, 20 mmol) and 1 M NaCl (2 cm$^3$) was mixed in a 10 cm$^3$ round-bottom flask, which was purged with N$_2$, and after adding 80 mg of tert-butyl hydroperoxide (TBHP), the mixture was stirred in the closed flask at 90° C. for 48 hours. The reaction mixture was cooled and dialyzed against deionized water for 48 hours for the removal of the unreacted monomer and NaCl (confirmed with an AgNO$_3$ test). The polymer solution was then freeze-dried to obtain an intermediate polyzwitterion (PZ) as a white polymer (4.45 g, 73%). The $^1$H NMR and $^{13}$C NMR spectra are shown in FIGS. 1b and 2b, respectively. At the onset of thermal decomposition (closed capillary): the color changed to dark brown at 290° C. and decomposed at 315° C., (Found: C, 50.8; H, 7.8; N, 4.5; S, 10.2%. C$_{13}$H$_{23}$NO$_5$S requires C, 51.13; H, 7.59; N, 4.59; S, 10.50%); $v_{max}$ (KBr) 3608, 3501, 2988, 2942, 1742, 1640, 1457, 1411, 1218, 1042, 907, 733, 601 cm$^{-1}$. The PZ has the structural formula:

Acid hydrolysis of the intermediate polyzwitterion prepared above was then performed. A solution of the intermediate polyzwitterion (3.0 g, 9.8 mmol) (derived from entry 7, Table 1) in 6 M HCl (60 mL) was heated in a closed vessel at 53° C. for 48 hours. The homogeneous mixture was cooled to room temperature and dialyzed against deionized water (to remove HCl) for 24 hours. During dialysis, the clear polymer solution became turbid after one hour and returned to being transparent after five hours. The resulting solution was freeze dried to obtain a polyzwitterionic acid (PZA) as a white solid (2.5 g, 92%). The polyzwitterionic acid was found to be water-soluble at 2% w/w at 20° C. However, at a 10% w/w, it was found to be soluble at 60° C. but insoluble at 20° C. The $^1$H NMR and $^{13}$C NMR spectra are shown in FIGS. 1c and 2c, respectively. At the onset of thermal decomposition (closed capillary), the color changed to dark brown at 270° C. and changed to black at 310° C. (Found: C, 47.4; H, 7.2; N, 4.8; S, 11.3%. $C_{11}H_{19}NO_5S$ requires C, 47.64; H, 6.91; N, 5.05; S, 11.56%); $v_{max}$ (KBr) 3450 (br), 2942, 2872, 2635, 2539, 1737, 1643, 1457, 1213, 1039, 898, and 733 cm$^{-1}$. The PZA antiscalant has the following structural formula:

It is interesting to note that the PZA antiscalant may be transformed into a poly(electrolyte-zwitterion) (PEZ). In order to transform the PZA into the PEZ, a mixture of the polyzwitterionic acid prepared above (derived from entry 7, Table 1) (0.730 g, 2.63 mmol) and NaOH (0.12 g, 3 mmol) in 2 cm$^3$ of water was stirred until the polymer dissolved (ca. 5 min). The resultant PEZ polymer was precipitated in methanol. After filtration and washing with excess methanol, the polymer was dried under vacuum at 55° C. to a constant weight (0.68 g, 86%). The resulting polymer was found to be extremely hygroscopic. The $^1$H NMR and $^{13}$C NMR spectra are shown in FIGS. 1c and 2c, respectively. At the onset of thermal decomposition (closed capillary), the color changed to brown at 335° C. and changed to black at 350° C. (Found: C, 43.8; H, 6.2; N, 4.5; S, 10.5%. $C_{11}H_{18}NNaO_5S$ requires C, 44.14; H, 6.06; N, 4.68; S, 10.71%); $v_{max}$ (KBr): 3447, 3023, 2941, 2859, 1628, 1460, 1408, 1337, 1204, 1045, 909, 732 cm$^{-1}$. The PEZ has the structural formula:

Solubility measurements of the intermediate polyzwitterion and the resultant poly(electrolyte-zwitterion) were carried out by heating a 2% (w/w) mixture in a solvent to 70° C. for one hour and then cooling to 23° C. The results of the solubility are shown in Table 2 below.

TABLE 2

Solubility[a,b] of PZ, PZA, and PEZ

| Solvent | g | PZ | PZA | PEZ |
|---|---|---|---|---|
| Formamide | 111 | + | + | + |
| Water[c] | 78.4 | + | + | + |
| Formic acid | 58.5 | + | + | + |
| DMSO | 47.0 | − | ± | + |
| Ethylene glycol | 37.3 | ± | − | − |
| DMF | 37.0 | − | ± | − |
| Methanol | 32.3 | − | ± | − |
| Triethylene glycol | 23.7 | − | − | − |
| Acetic acid | 6.15 | − | − | − |

[a]2% (w/w) 0f polymer-water mixture (solution) was made after heating the mixture at 70° C. for 1 h and then cooling to 23° C.
[b]'+' indicates soluble, '−' indicates insoluble, and '±' indicates partially soluble.
[c]10% (W/W) of PZA was insoluble in water.

Potentiometric titrations were carried out with the pH of the solutions being recorded using a Corning® pH Meter 220, manufactured by Corning, Inc. of Corning, N.Y. Solutions of the PZA in 200 cm$^3$ of salt-free water or 0.1 M NaCl were prepared. The log K of the carboxyl group was calculated at each pH value by the Henderson-Hasselbalch equation, log $K = pH - \log[(1-\alpha)/\alpha]$ where $\alpha$ is the ratio $[ZH^\pm]_{eq}/[Z]_o$. For the titration with NaOH, the $[Z]_o$ is the initial concentration of repeating units in PZA, and $[ZH^\pm]_{eq}$ is the concentration of the protonated species at the equilibrium, given by $[ZH^\pm]_{eq} = [Z]_o - C_{OH^-} - [H^+] + [OH^-]$, where $C_{OH^-}$ is the concentration of the added NaOH. The $[H^+]$ and $[OH^-]$ at equilibrium were calculated from the pH value. The polyelectrolytes having apparent basicity constants are described by $pH = \log[K°] + n\log[(1-\alpha)/\alpha]$, where $\log K° = pH$ at $\alpha = 0.5$ and $n=1$ (in the case of sharp basicity constants). The linear regression fit of pH vs. $\log[(1-\alpha)/\alpha]$ gave $\log K°$ and n as the intercept and slope, respectively. In the titration using HCl in 0.1 M NaCl, the titration was carried out in the presence of 1.5-2.5 cm$^3$ of 0.1036 N NaOH to attain the required values of the $\alpha$. In this case, $[ZH^\pm]_{eq} = [Z]_o + C_{H+} - C_{OH^-} - [H^+] + [OH^-]$, where $C_{H+}$ is the concentration of the added HCl. Simultaneous protonation of the two basic sites ($CO_2^-$ and $SO_3^-$) is least likely, since the basicity constant for the $SO_3^-$ group (log K: ~−2.1) is less than that of the $CO_2^-$ group by at least five orders of magnitude. It should be noted that the basicity constant log K of $RSO_3^-$ (or any base) is the $pK_a$ of its conjugate acid, $RSO_3H$.

In order to evaluate antiscalant behavior, the brine concentrations and temperatures encountered in a reverse osmosis (RO) desalination process were considered to study the precipitation and inhibition of calcium sulfate (gypsum) using the PZA. Analysis was performed on brackish water and reject brine from a RO plant at King Fahd University of Petroleum & Minerals (KFUPM), located in Dhahran, Saudi Arabia. The concentration of reject brine (i.e., concentrated brine) at 70% recovery was found to be 1 CB (concentrated brine standard). Analysis of brine in the RO plant revealed concentrations of $Ca^{2+}$ in the brackish feed water and in the reject brine of 281.2 and 866.7 ppm, respectively, while the corresponding concentration of $SO_4^{2-}$ was found to be 611 and 2,100 ppm, respectively. The evaluation of the present scale inhibitor was performed in a solution containing $Ca^{2+}$ and $SO_4^{2-}$ at 1.5 times the concentration in the 1 CB sample from the RO plant. The solubility data of $CaSO_4$ confirmed that 1.5 CB solutions would be supersaturated with respect to $CaSO_4$.

Solutions containing $Ca^{2+}$ and $SO_4^{2-}$ ions equal to three times the levels of concentrated brine (CB) were prepared by dissolving the appropriate amount of $CaCl_2$ and $Na_2SO_4$, respectively, in deionized water. A solution of 3 CB calcium chloride (60 mL) containing the PZA (10 ppm) was prepared in a round bottom flask and heated to 40° C.±1° C. A preheated (40° C.) solution of 3 CB sodium sulfate (60 mL) was added quickly to the flask, which was then stirred at 300 rpm using a magnetic stir bar. The resultant solution containing 10 ppm of the PZA became 1.5 CB, which is 1.5×866.7 mg/L (i.e., 1300 mg/L in $Ca^{2+}$) and 1.5×2100 mg/L (i.e., 3150 mg/L in $SO_4^{2-}$).

Conductivity measurements were initially performed at ten minute intervals to quantify the effectiveness of the PZA antiscalant. The drop in conductivity indicates the precipitation of $CaSO_4$. Induction time was measured with a decrease in conductivity when precipitation started. Visual inspection was carefully performed to observe any turbidity arising from precipitation.

The IR spectra of the zwitterionic monomer N-carboethoxymethyl-3-(N,N-diallylamino)propanesulfonate, the PZ, the PZA and the PEZ indicate the presence of sulfonate groups by their typical characteristic bands around ~1218 $cm^{-1}$ and ~1042 $cm^{-1}$ Absorptions at 1742 $cm^{-1}$ and 1737 $cm^{-1}$ were assigned to a C=O stretch of COOEt and COOH of the zwitterionic monomer and the PZA, respectively, while the symmetric and anti-symmetric stretching of $COO^-$ in the PEZ appeared at 1408 $cm^{-1}$ and 1628 $cm^{-1}$. The absorption peaks of $COO^-$ are in agreement with those observed for simple amino acids. The absence of any residual alkene proton or carbon signals in the polymer spectra suggested that the formation of the polymer chains happened by termination via the chain transfer and/or coupling process. The absence of methyl protons and carbon peaks of the ester group ($OCH_2CH_3$) in the spectra of the PZA and the PEZ indicate its complete removal by hydrolysis. Integration of the relevant peaks in the $^{13}C$ NMR spectrum yielded a 75/25 cis-trans ratio of the ring substituents at $C_{b,b}$ and is similar to that observed for polymers derived from quaternary ammonium salts.

Figure 3A:
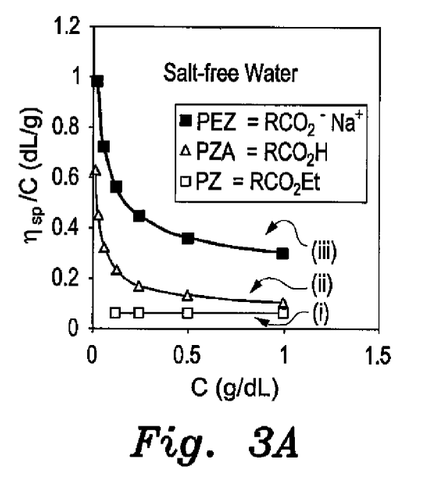
FIG. 3A is a graph showing the viscosity behavior of the PZ, PZA and PEZ in salt-free water at a temperature of 30° C.
Figure 3B:
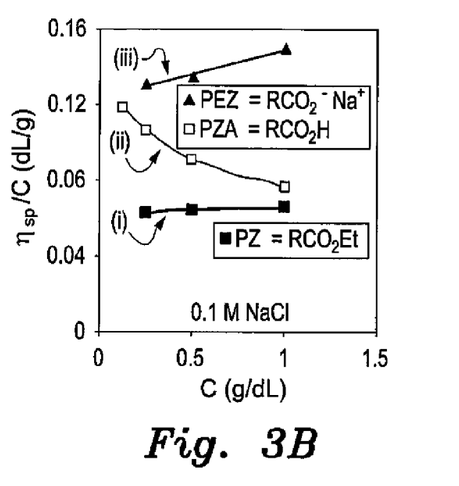
FIG. 3B is a graph showing the viscosity behavior of the PZ, PZA and PEZ in 0.1 M NaCl solution at a temperature of 30° C.

Viscosity measurements were made with an Ubbelohde type viscometer (having a viscometer constant of 0.005718 cSt/s at all temperatures) using $CO_2$-free water under $N_2$ in order to prevent $CO_2$ absorption that may affect the viscosity data. Viscosity data for the polymers PZ, PZA and PEZ, having identical degree of polymerization, were evaluated by the Huggins equation: $\eta_{sp}/C=[\eta]+k[\eta]^2C$. FIGS. 3A and 3B display the viscosity behavior of the polymers (entry 7, Table 1) in salt-free water and 0.1 M NaCl, respectively. In salt-free water, the viscosity plots for the PZA (±) and the PEZ (–±) are typical of polyelectrolytes (i.e., concave upwards), whereas, the plot for (±) PZ is linear, similar to that observed for a normal uncharged polymer (see FIG. 3A). The presence of an extra negative charge per repeating unit in the anionic-zwitterionic (–±) PEZ makes its viscosity behavior typical of anionic polyelectrolytes. The anionic motifs in the PEZ, thus, dominate the viscosity behavior. The weakly acidic $CO_2H$ group in zwitterionic PZA (±) undergoes dissociation in aqueous solution to anionic-zwitterionic (–±) motifs in the PEZ (i.e., [( . . . $N^{\pm}$ . . . $CO_2H$ PZA ⇌ . . . $N^{\pm}$ . . . $CO_2^-$ PEZ]), and since the extent of dissociation increases with dilution, the reduced viscosity increases with decreasing concentration of PZA. Based on the carboxyl $pK_a$ value of 3.33 in (±) PZA in salt-free water, its percent dissociation in 1.0, 0.5, 0.25 and 0.125 g/dL solutions was calculated as 11, 15, 20 and 27, respectively. It should be noted that polymer (–±) PEZ has higher viscosity values than (±) PZA as a result of the polymer chains of the former, experiencing increased repulsions among the completely dissociated $CO_2^-$ anions.

In the presence of added salt (0.1 N) the viscosity plots for PZ (±) and PEZ (–±) remain linear, as expected of any polyelectrolyte (see FIG. 3B). The progressive dissociation of the $CO_2H$ groups in (±) PZA, however, keeps the curve concave upwards. Based on the carboxyl $pK_a$ value of 2.95 in 0.1 M NaCl, its percent dissociation in 1.0, 0.5, 0.25 and 0.125 g/dL solutions was determined to be 16, 22, 30 and 39, respectively. The polymer PEZ, as expected, had higher viscosity values than the PZA as a result of the $CO_2^-$ groups of the former being in the almost complete dissociated form.

Figure 3C:
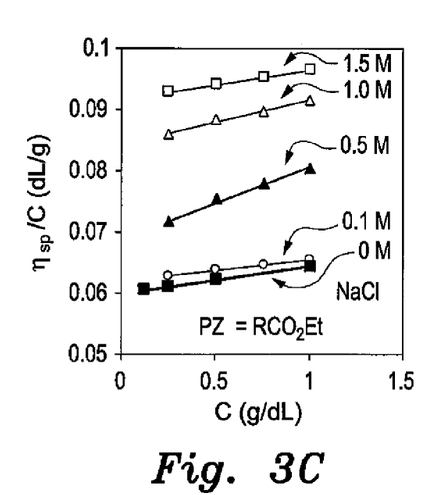
FIG. 3C is a graph showing the viscosity behavior of the PZ as a function of NaCl concentration at a temperature of 30° C.
Figure 3D:
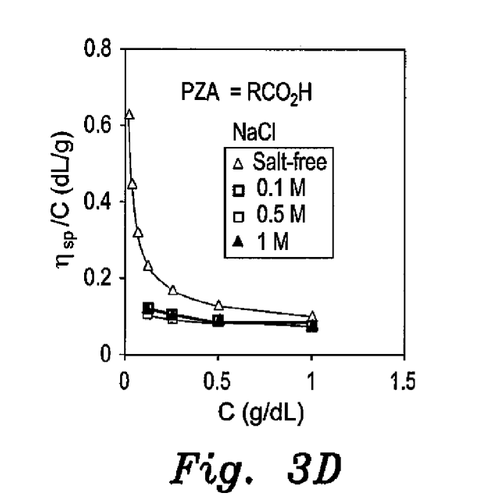
FIG. 3D is a graph showing the viscosity behavior of the PZA as a function of NaCl concentration at a temperature of 30° C.

The dependency of viscosity of (±) PZ and (±) PZA in aqueous solution containing various concentration of NaCl are shown in FIGS. 3C and 3D, respectively. An increase in the intrinsic viscosity with increasing NaCl concentration explains the anti-polyelectrolyte behavior of the PZ. The viscosity values of (±) PZA, on the other hand, decrease with the increase in the salt concentration from salt-free to 0.1 M NaCl, and thereafter remain almost similar with further increases in the salt concentration to 0.5 and 1.0 M NaCl. The carboxyl $pK_a$ in the PZA is 3.33 and 2.95 in salt-free and 0.1 M NaCl, respectively. As such, the percent dissociation of $CO_2H$ groups is expected to increase with the increase in the ionic strength of the medium. The increased $CO_2H$ dissociation is thus expected to increase the viscosity values as a result of the increased repulsion among the $CO_2^-$ anions. The strong binding ability of the cationic nitrogens by $Cl^-$ is also expected to increasingly expose the $CO_2^-$ and $SO_3^-$ to experience strong repulsions, since the $Na^+$ ion with its fairly large hydration shell cannot effectively shield the anions. However, the viscosity values decrease with the increase in NaCl concentration, since the exposed anionic carboxylate and sulfonate pendants in a sea of $Na^+$ ions are considerably shielded so as to minimize repulsions among them and, thusly, decrease the viscosity values (see FIG. 3D).

Figure 4A:
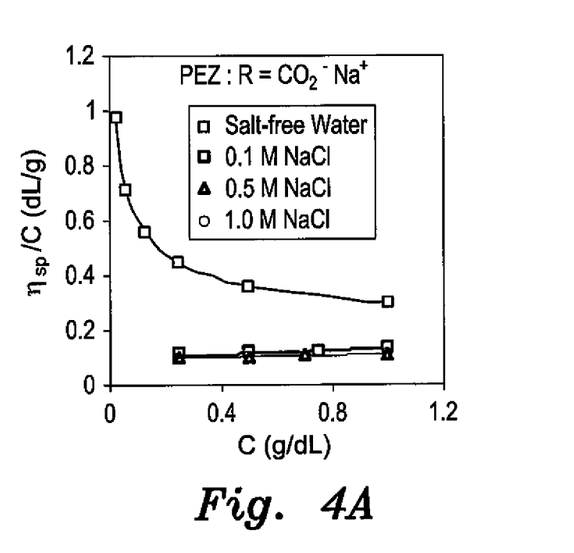
FIG. 4A is a graph showing the viscosity behavior of the PEZ as a function of NaCl concentration at a temperature of 30° C.

The viscosity solution behavior of polyampholytes, with or without charge symmetry, may be described mathematically as:

$$v^* = -\frac{\pi(fl_B)^2}{\kappa_S} + \frac{4\pi l_B \Delta f^2}{\kappa_S^2}$$

where $I_B$ is the Bjerrum length, f is the total fraction of charged monomers, Δf is the charge imbalance, and $\kappa_S$ is the Debye-Huckel screening parameter. Since Δf=0 for the electroneutral (±) PZ, the screening of the Coulombic repulsive interactions among excess charges, described by the second term of the above equation, vanishes. The solution behavior must then be described by the first term, describing the screening of the attractive polyampholytic interactions. The negative electrostatic excluded volume indicates contraction to a collapsed polymer chain. For (±) PZA and (–±) PEZ, Δf≠0. The charge imbalance is at a maximum for the PEZ, while it depends on the extent of dissociation in the case of the PZA. In either case, the size of the polymer chain depends on the relative importance of the first and second terms of the above equation. For the PEZ having the maximum value of Δf, the second term of the equation dominates, and the resultant positive electrostatic excluded volume leads to the expansion of the polymer chains. The increased percent dissocia tion of $CO_2H$ in the PZA associated with the decrease in polymer concentration increases the progressive importance of the second term of the equation. This is corroborated by the observed increase of the viscosity values with decrease in the polymer concentration (as shown in FIG. 3D). As the salt (NaCl) concentration increases (from 0 to 0.1 N), the magnitude of the first and second terms increase and decrease, respectively. As a result, the contraction of the polymer chain occurs. At higher concentrations of salt (0.5 M or more), the electrostatic contribution to the polymer size becomes insignificant as a result of minimized importance of both terms (see FIG. 3D and FIG. 4A).

Figure 5:
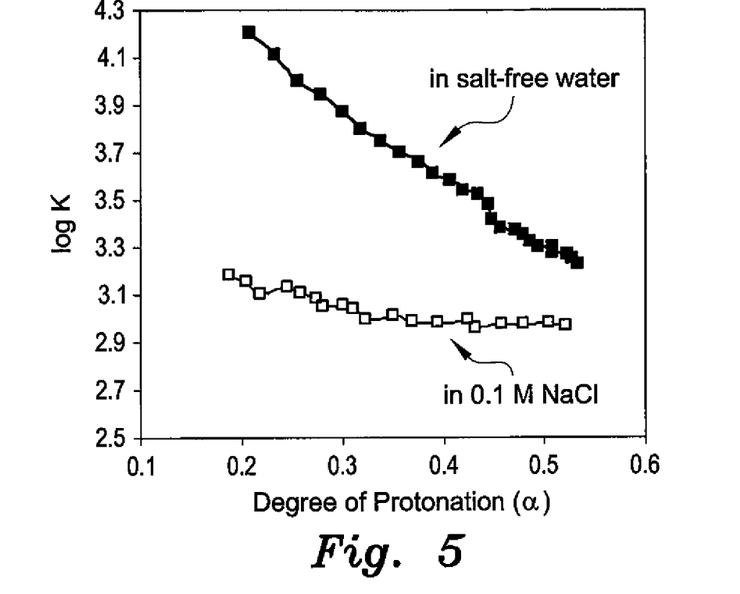
FIG. 5 is a graph showing the log K behavior for the PZA as a function of the degree of protonation ($\alpha$) in both salt-free water and 0.1 N NaCl at a temperature of 30° C.

The basicity constant log K for the protonation of the $CO_2^-$ of the PEZ is of "apparent" nature, as demonstrated in FIG. 5, which reveals a change in log K with the degree of protonation ($\alpha$) in going from one end to the other end of the titration. The n values of 2.52 and 1.30 in salt-free water and 0.1 M NaCl, respectively, reflect a stronger polyelectrolyte effect in the former medium, as shown below in Table 3. The n values greater than one indicate the decrease in the basicity of $CO_2^-$ anions with the increase in $\alpha$, owing to a progressive decrease in the electrostatic field force that encourages protonation as a result of changing the overall negative charge density in (−±) PEZ to electroneutral (±) PZA.

TABLE 3

Experimental DATA for the Protonation of the Polymers PZA ($ZH^\pm$) at 23° C. in Salt-Free Water and 0.1M NaCl

| Run | $ZH^\pm$ (mmol) | $C_T^a$ (mol/dm$^3$) | $\alpha$-range | pH-range | Points$^b$ | Log K$^{o,e}$ | N$^e$ | R$^2$,$^d$ |
|---|---|---|---|---|---|---|---|---|
| | | | Polymer in Salt-Free water | | | | | |
| 1 | 0.3570 ($ZH^\pm$) | −0.1036 | 0.53-0.21 | 3.17-4.79 | 25 | 3.31 | 2.53 | 0.9983 |
| 2 | 0.2881 ($ZH^\pm$) | −0.1036 | 0.55-0.21 | 3.19-4.68 | 22 | 3.37 | 2.55 | 0.9969 |
| 3 | .2268 ($ZH^\pm$) | −0.1036 | 0.53-0.21 | 3.27-4.76 | 20 | 3.32 | 2.49 | 0.9960 |
| | | Average | | | | 3.33 | 2.52 | |
| | log K° = 3.33 + 1.52 log[(1 − $\alpha$)/$\alpha$] For the reaction $Z^{\pm-} + H^+ \rightleftarrows ZH^\pm$ Polymer in 0.1M NaCl | | | | | | | |
| 1 | 0.3195$^f$ ($ZH^\pm$) | 0.09930 | 0.16-0.59 | 3.88-2.75 | 24 | 2.91 | 1.25 | 0.9935 |
| 2 | 0.2578$^f$ ($ZH^\pm$) | 0.09930 | 0.18-0.52 | 3.89-2.98 | 21 | 2.98 | 1.35 | 0.9942 |
| 3 | 0.2034$^f$ ($ZH^\pm$) | 0.09930 | 0.19-0.52 | 3.82-2.93 | 19 | 2.95 | 1.31 | 0.9912 |
| | | Average | | | | 2.95 (4) | 1.30 (5) | |
| | log K° = 2.95 + 0.30 log[(1 − $\alpha$)/$\alpha$] For the reaction $Z^{\pm-} + H^+ \rightleftarrows ZH^\pm$ | | | | | | | |

$^a$Titrant concentration (negative and positive values indicate titrations with NaOH and HCl, respectively).
$^b$Number of data points from titration curve.
$^c$Values in the parentheses are standard deviations in the last digit.
$^d$R = Correlation coefficient.
$^e$log K = log K° + (n − 1) log [(1 − $\alpha$)/$\alpha$].
$^f$Titration was carried out in the presence of 1.5-2.5 cm$^3$ of 0.1036M NaOH added to attain the required values of the $\alpha$.

The dependency of viscosity of the PEZ (−±) in aqueous solution containing various concentration of NaCl are shown in FIG. 4A. It should be noted that the viscosity values remain similar in 0.1, 0.5 and 1.0 M NaCl. The increased salt concentration thus has an equal and opposite influence on the anionic (−) and zwitterionic (±) motifs; the presence of NaCl helps the anionic portions to coil up and the zwitterionic portions to expand. It should be further noted that the PEZ is salt-tolerant, in the sense that its viscosity is independent of the salt concentration.

Figure 4B:
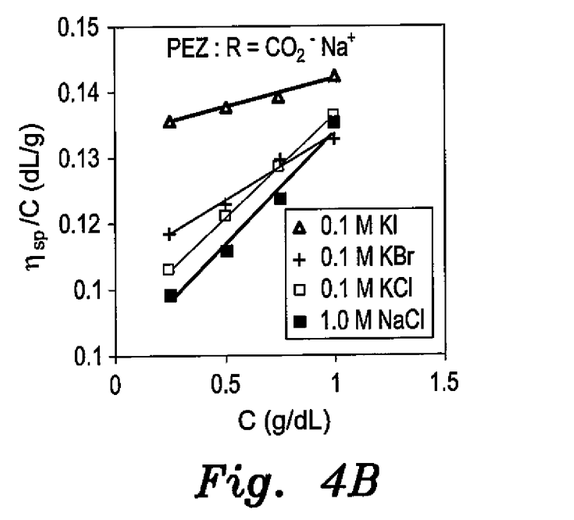
FIG. 4B is a graph showing the viscosity behavior of the PEZ as a function of salt concentration for 0.1 M KI, KBr, KCl and NaCl at a temperature of 30° C.

The intrinsic viscosity [$\eta$] of (−±) PEZ in 0.1 M NaCl, KCl, KBr, and KI at 30° C. was determined to be 0.0997, 0.105, 0.113 and 0.133 dL/g, respectively. The intrinsic viscosity is thus found to decrease in the order KCl>NaCl (for common anions) and KI>KBr>KCl (for common cations), as shown in FIG. 4B. It is known that while the intrinsic viscosity of cationic polyelectrolytes decreases in 0.1 N aqueous salt solution in the order KCl>KBr>KI, the order is reversed for polybetaines or polyampholytes. The observed salt effect thus reflects the zwitterionic motifs' dominance in dictating the viscosity behavior of the PEZ, since the viscosity of anionic polyelectrolytes is expected to be independent of the effect of anions (such as Cl$^-$, Br$^-$, etc.). This is expected since the more polarizable (soft) iodide anion is particularly effective in neutralizing the cationic charges on the polymer backbone, thereby forcing the expansion of the macromolecule so as to minimize repulsion among the more exposed negatives charges on the pendants.

The neutralization process, which transforms the anionic motifs in (−±) PEZ to zwitterionic motifs in (±) PZA, may be described by the viscometric transformation of FIG. 3A (iii) to 3A (ii) in salt-free water and FIG. 3B (iii) to 3B (ii) in 0.1 M NaCl. The former reveals a bigger change in viscosity values than the latter transformation. Since the PEZ in salt-free water, as shown in FIG. 3A (iii), is the most expanded (thus more hydrated), the greater number of water molecules are released as a result of each protonation in salt-free water than in 0.1 M NaCl, thereby leading to an entropy-driven higher basicity constant and n in the former medium (as shown above in Table 3). The basicity constant (log K°) of the carboxyl group was found to be 3.33 and 2.95 in salt-free water and 0.1 M NaCl, respectively. It should be noted that carboxyl basicity constant (log K°) in the PEZ is the $pK_a$ value for the corresponding conjugate acid PZA.

Figure 6:
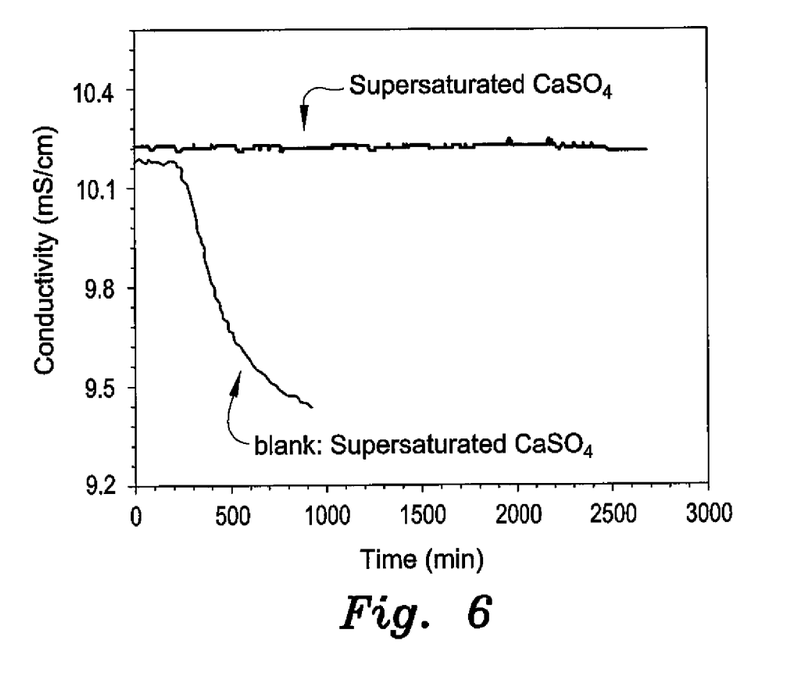
FIG. 6 is a graph illustrating the precipitation behavior of a supersaturated solution of CaSO$_4$ in a 10 ppm solution of the PZA compared against a control.

With regard to the effectiveness of the PZA as an antiscalant, the precipitation behavior of a supersaturated solution of $CaSO_4$ containing 1,300 ppm of $Ca^{2+}$ and 3,150 ppm of $SO_4^{2-}$ in the absence and presence of 10 ppm of the PZA was investigated. Conductivity measurements were made at an interval of every 10 minutes, initially, to quantify the effectiveness of the PZA antiscalant. Induction time was measured when precipitation started, which was observed by a drop in conductivity. No noticeable change in the conductivity was found for a duration of 2,670 minutes (i.e., 44.5 hours). The conductivity at zero and 2,670 minutes were measured to be 10.24 mS/cm and 10.22 mS/cm, respectively, virtually assuring ~100% scale inhibition in the presence of 10 ppm of PZA, as shown in FIG. 6. It should be noted that in the absence of the antiscalant PZA, the precipitation started as indicated by the drop in conductivity shown in FIG. 6. The results indicate that the PZA antiscalant additive is very effective against precipitation of gypsum at 40° C. and, thus, would be suitable for use in inhibiting calcium sulfate precipitation in desalination plants.

It is to be understood that the present invention is not limited to the embodiments described above, but encompasses any and all embodiments within the scope of the following claims.

We claim:

1. A method of making a polyzwitterionic antiscalant compound, comprising the steps of:

cyclopolymerizing N-carboethoxymethyl-3-(N,N-diallylamino)propanesulfonate monomer in aqueous solution using tert-butyl hydroperoxide as an initiator to form a polyzwitterion having the structural formula:

wherein the step of cyclopolymerizing comprises the steps of:
preparing a solution of the monomer in 1M NaCl aqueous solution;
adding the tert-butyl hydroperoxide initiator to the solution;
stirring the solution in a closed vessel at a temperature of 90° C. for a period of 48 hours;
cooling the solution;
dialyzing the cooled solution against deionized water for a period of 48 hours;
removing unreacted monomer and NaCl from the solution; and
freeze-drying the solution to produce the polyzwitterion; and performing acid hydrolysis on ester groups of the polyzwitterion to form a polyzwitterionic acid having the structural formula:

wherein the step of performing acid hydrolysis comprises the steps of:
preparing a solution of the polyzwitterion in HCl;
hydrolyzing the solution in a closed vessel at a temperature of 53° C. for a period of 48 hours;
cooling the hydrolyzed solution to room temperature;
dialyzing the cooled, hydrolyzed solution against deionized water for a period of 24 hours; and
freeze-drying the dialyzed solution to produce the polyzwitterionic acid.

* * * * *